US009820603B2

(12) United States Patent
Singer et al.

(10) Patent No.: US 9,820,603 B2
(45) Date of Patent: Nov. 21, 2017

(54) COOKING SYSTEM POWER MANAGEMENT

(71) Applicant: Starbucks Corporation, Seattle, WA (US)

(72) Inventors: Marc Singer, Seattle, WA (US); Chris Doughty, Seattle, WA (US); Randy Hulett, Seattle, WA (US); David Doucette, Seattle, WA (US); Dan Apone, Seattle, WA (US); Frank Roth, Bellevue, WA (US)

(73) Assignee: STARBUCKS CORPORATION, Seattle, WA (US)

(*) Notice: Subject to any disclaimer, the term of this patent is extended or adjusted under 35 U.S.C. 154(b) by 400 days.

(21) Appl. No.: 14/548,226

(22) Filed: Nov. 19, 2014

(65) Prior Publication Data

US 2015/0148980 A1    May 28, 2015

Related U.S. Application Data

(60) Provisional application No. 61/906,872, filed on Nov. 20, 2013, provisional application No. 61/906,871, filed on Nov. 20, 2013.

(51) Int. Cl.
*A47J 27/62* (2006.01)
*A47J 31/40* (2006.01)
(Continued)

(52) U.S. Cl.
CPC ............. *A47J 27/62* (2013.01); *A47J 31/404* (2013.01); *A47J 31/42* (2013.01); *A47J 31/60* (2013.01);
(Continued)

(58) Field of Classification Search
None
See application file for complete search history.

(56) References Cited

U.S. PATENT DOCUMENTS 6,202,101 B1    3/2001  Chin et al.
9,218,633 B2   12/2015  Hulett et al.
(Continued)

FOREIGN PATENT DOCUMENTS

CN    1229955 A     9/1999
JP    H09-198448    7/1997
(Continued)

OTHER PUBLICATIONS

Final Office Action for U.S. Appl. No. 13/684,062 dated Jan. 13, 2015 in 8 pages.
(Continued)

*Primary Examiner* — Mohammad Ali
*Assistant Examiner* — Saad M Kabir
(74) *Attorney, Agent, or Firm* — Knobbe, Martens, Olson & Bear, LLP

(57) ABSTRACT

A cooking environment is described for allocating power between multiple cooking systems and providing a calculated amount of energy to a cooking system. The cooking systems can each include a receptacle and a heating/cooling element to heat a product within the receptacle. A controller can receive requests for power from the cooking systems. Based on the requests for power, the controller allocates an amount of time within a time period in which the heating/cooling elements of each cooking system receive electrical energy. The controller can also allocate specific intervals within the time period in which the heating/cooling elements receive electrical energy.

19 Claims, 5 Drawing Sheets

(51) Int. Cl.

| | | |
|---|---|---|
| *G05D 23/19* | (2006.01) | |
| *H02J 3/14* | (2006.01) | |
| *G05B 15/02* | (2006.01) | |
| *G05F 1/66* | (2006.01) | |
| *A47J 31/42* | (2006.01) | |
| *A47J 31/60* | (2006.01) | |
| *A47J 42/50* | (2006.01) | |

(52) U.S. Cl.
CPC .............. *A47J 42/50* (2013.01); *G05B 15/02* (2013.01); *G05D 23/1951* (2013.01); *G05F 1/66* (2013.01); *H02J 3/14* (2013.01)

(56) References Cited

U.S. PATENT DOCUMENTS

| | | |
|---|---|---|
| 2004/0236696 A1 | 11/2004 | Aoki et al. |
| 2005/0121978 A1 | 6/2005 | McAvoy |
| 2007/0150300 A1 | 6/2007 | Fukazawa et al. |
| 2007/0185776 A1 | 8/2007 | Nguyen et al. |
| 2008/0029595 A1 | 2/2008 | Waller |
| 2009/0204504 A1 | 8/2009 | De Araujo |
| 2010/0052421 A1 | 3/2010 | Schindler et al. |
| 2010/0280960 A1 | 11/2010 | Ziotopoulos |
| 2011/0167440 A1 | 7/2011 | Greenfield |
| 2011/0258072 A1 | 10/2011 | Kerker et al. |
| 2012/0095805 A1 | 4/2012 | Ghosh |
| 2012/0310757 A1 | 12/2012 | Kim et al. |
| 2013/0131883 A1 | 5/2013 | Yamada |
| 2013/0132214 A1 | 5/2013 | Hulett et al. |
| 2013/0275181 A1 | 10/2013 | DiGioacchino et al. |
| 2013/0297089 A1 | 11/2013 | Fu et al. |
| 2016/0143477 A1 | 5/2016 | Hulett et al. |

FOREIGN PATENT DOCUMENTS

| | | |
|---|---|---|
| JP | 2002-245154 | 8/2002 |
| JP | 2003-76757 | 3/2003 |
| JP | 2006-215647 | 8/2006 |
| JP | 2007-287082 | 11/2007 |
| JP | 2008-293322 | 12/2008 |
| JP | 2009-151408 | 7/2009 |
| JP | 2010-055248 | 3/2010 |
| JP | 2011-210008 | 10/2011 |
| TW | 200926034 | 6/2009 |
| TW | I343025 | 6/2011 |
| WO | WO 2011/006198 | 1/2011 |
| WO | WO 01/63522 | 8/2011 |
| WO | WO 2013/078428 | 5/2013 |
| WO | WO 2015/077237 | 5/2015 |

OTHER PUBLICATIONS

International Search Report and Written Opinion for Application No. PCT/US2012/66417 mailed May 31, 2013 in 14 pages.
Office Action for U.S. Appl. No. 13/684,062 dated Dec. 20, 2013 in 9 pages.
Office Action for U.S. Appl. No. 13/684,062 dated Aug. 19, 2014 in 8 pages.
Office Action for U.S. Appl. No. 13/684,062 dated May 19, 2015 in 9 pages.
Office Action for Chinese Application No. 201280063764.4 dated Jun. 23, 2016, in 15 pages.
Second Office Action for Chinese Application No. 201280063764.4 dated Mar. 9, 2017, in 77 pages.
Office Action in Japanese Application No. 2014-543588 dated Aug. 15, 2016 in 8 pages.
Office Action in European Application No. 12808948.9 dated Dec. 20, 2016 in 7 pages.
International Search Report and Written Opinion for Application No. PCT/US2014/066174 mailed Jul. 30, 2015 in 17 pages.
International Preliminary Report on Patentability for Application No. PCT/US2014/066174 mailed May 24, 2016 in 11 pages.

COOKING SYSTEM POWER MANAGEMENT

RELATED APPLICATIONS

The present application claims priority benefit to U.S. Patent Application No. 61/906,872, entitled, COOKING SYSTEM POWER MANAGEMENT, filed Nov. 20, 2013, and U.S. Patent Application No. 61/906,871, entitled, APPARATUSES, SYSTEMS, AND METHODS FOR BREWING A BEVERAGE, filed Nov. 20, 2013, each of which is incorporated herein by reference in its entirety. The present application also incorporates U.S. patent application Ser. No. 14/548,174, entitled, APPARATUSES, SYSTEMS, AND METHODS FOR BREWING A BEVERAGE, filed Nov. 19, 2014 by reference in its entirety.

BACKGROUND

Heating and cooling devices in cooking systems, such as boilers in coffee machines, coils in hot plates, compressors in icemakers, etc., use significant amounts of energy to heat or cool a product, such as food or drink. However, the amount of power available to the heating/cooling devices often exceeds the amount of power used by the device, or even the amount of power that the device can safely use. In addition, the heating/cooling devices often use power in bursts such that the power used by the cooking changes substantially over time. For example, a boiler uses a significant amount of energy to heat a liquid from room temperature to a brewing temperature. However, prior to heating the liquid, the boiler uses little to no energy, and once the brewing temperature is reached, the boiler uses significantly less energy to maintain the temperature. As such, power that is allocated to the cooking systems is left unused.

DETAILED DESCRIPTION

Generally described, the present disclosure is directed to a system, method, and computer readable non-transitory storage medium for allocating power between multiple cooking systems and providing a calculated amount of energy to a cooking system. Specifically, aspects of the disclosure will be described with regard to obtaining requests for power from multiple cooking systems and allocating an amount of time within a time period for heating/cooling elements of each cooking system to receive electrical energy.

Additional aspects of the disclosure will be described with regard to requesting power based on a measured process variable, such as the temperature of a product in a receptacle, and alternately allocating and de-allocating power to a heating/cooling element based on received power allocation instructions. In addition, aspects of the disclosure will be described with regard to determining an amount of a product, such as a liquid, dispensed from a receptacle, calculating the energy to heat a replacement product, such as a replacement volume of liquid, to a predetermined temperature, and providing the calculated energy to the heating/cooling element.

Figure 1:
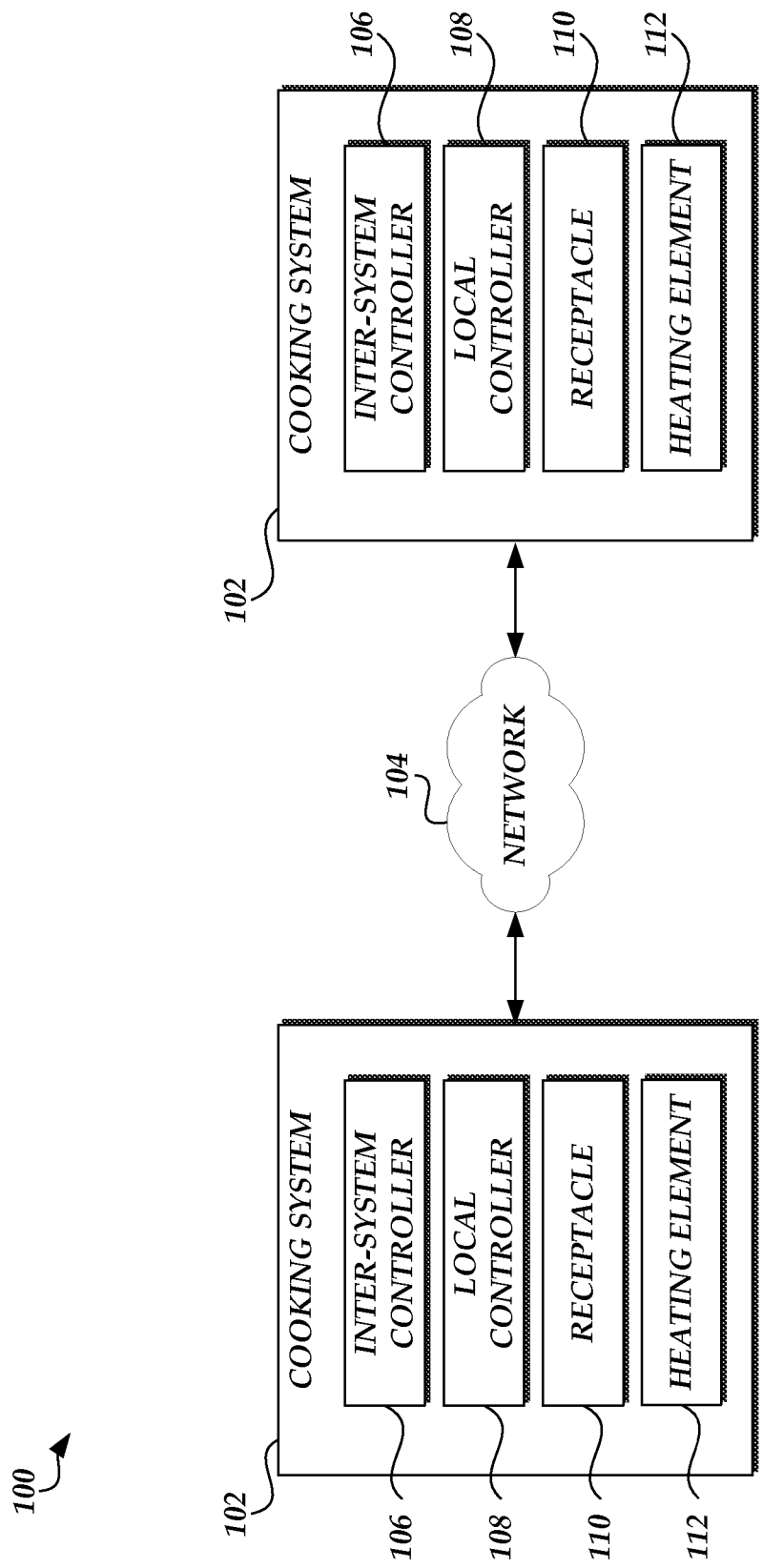
FIG. 1 is a block diagram illustrative of a cooking environment including two cooking systems.

FIG. 1 is a block diagram illustrative of a cooking environment 100 for allocating power between multiple cooking systems 102. As illustrated in FIG. 1, the cooking environment 100 can include one or more cooking systems 102. For example, the cooking environment 100 can include one or more restaurants that include cooking systems 102 that can communicate with each other via the network 104. In the illustrated embodiment of FIG. 1, two cooking systems 102 are shown. However, it will be understood that aspects of the description can be applied to more than two cooking systems 102 or to a single cooking system 102. When the cooking environment 100 includes two or more cooking systems 102, the cooking systems 102 can communicate with each other via a communication network 104.

The cooking systems 102 can be any type of cooking device, such as, but not limited to, coffee machines, grinders, skillets, fryers, microwave ovens, ovens, stoves, toaster ovens, hot plates, mixers, blenders, icemakers, freezers, and the like. Some embodiments of the cooking systems 102 are disclosed in U.S. patent application Ser. No. 13/684,117, filed on Nov. 21, 2012, and entitled APPARATUS, SYSTEMS, AND METHODS FOR BREWING A BEVERAGE, U.S. Patent Application No. 61/906,871, entitled, APPARATUSES, SYSTEMS, AND METHODS FOR BREWING A BEVERAGE, filed Nov. 20, 2013, and U.S. patent application Ser. No. 14/548,174, entitled, APPARATUSES, SYSTEMS, AND METHODS FOR BREWING A BEVERAGE, filed Nov. 19, 2014, each of which is hereby incorporated by reference in its entirety.

In the illustrated embodiment of FIG. 1, each cooking system 102 includes an inter-system controller 106, a local controller 108, a receptacle 110, and a heating/cooling element 112. The receptacle 110 can be used to hold a liquid (a "liquids receptacle") and/or a solid (a "solids receptacle"). For example, the receptacle 110 can include, but is not limited to a tank, reservoir, basin, cistern, vat, container, a tray, a plate, a rack, etc. The heating/cooling element 112 can include a device that uses electrical energy to generate and/or remove heat. For example, the heating/cooling element can include, but is not limited to, resistance wire, etched foil, coils, induction heater, radiator, heat exchanger, magnetron, thermoelectric device, Peltier cooler, compressor, etc.

It will be understood that each cooking system 102 can include fewer or more components as desired. For example, in some embodiments, each cooking system 102 can include a brew chamber for brewing a heated liquid. In some embodiments, the inter-system controller 106 and/or the local controller 108 can be implemented as separate devices distinct from the cooking systems 102, and can communicate with the cooking systems 102 via the network 104. In certain embodiments, the inter-system controller 106 and the local controller 108 in each cooking system 102 can be implemented as a single controller or as separate controllers.

Inter-System Controller

The inter-system controller 106 can be used for high-level functionality, such as, but not limited to, detecting multiple cooking systems, selecting an arbiter, allocating power between cooking systems 102, activating/de-activating the heating/cooling elements 110, inter-system communication, safety protocols, etc., and can be implemented using a microcontroller, microprocessor, field programmable gate array (FPGA), programmable logic device (PLD), and the like.

Detecting Multiple Cooking Systems

In some embodiments, the inter-system controller(s) 106 can detect the presence of different cooking systems 102, even if the cooking systems 102 are powered off. For example, once turned on, the inter-system controller 106 of a first cooking system 102, can query whether other cooking systems 102 are present and activated via the network 104. If activated, the other cooking systems 102 can respond via the network 104. If the first cooking system 102 does not receive any response from any other cooking systems 102, the inter-system controller 106 can determine that no other cooking systems 102 are activated.

Upon determining that no other cooking systems 102 are activated within the cooking environment 100, the inter-system controller 106 can determine whether any other cooking systems 102 are present within the cooking environment 100. The inter-system controller 106 can determine the presence of other cooking systems 102 in a variety of ways. For example, the inter-system controller 106 can query a resistor value in other cooking systems 102 or can sense an amount of current that is being drawn by additional cooking systems 102.

In some embodiments, each cooking system 102 can include a resistor that can be checked, even when the cooking system 102 is deactivated. Accordingly, using an ohmmeter, the inter-system controller 106 can query the resistor value of the other cooking systems 102. If the sensed resistor value satisfies an activated system resistor threshold, the inter-system controller 106 can determine that another cooking system 102 is present in the cooking environment 100. If the sensed resistor value does not satisfy the activated system resistor threshold, the inter-system controller 106 can determine that there is not another cooking system 102 present in the cooking environment 100. The process can be repeated with additional cooking systems 102 until the inter-system controller 106 determines the number of cooking systems 102 within the cooking environment 100. The activated system resistor threshold can be determined based on a resistor installed on each cooking system 102.

In certain embodiments, the cooking systems 102 can include an ammeter that can be used to detect the amount of current being drawn from other cooking systems 102. Using the ammeter, if the inter-system controller 106 determines that an activated system current threshold is satisfied, the inter-system controller 106 can determine that another cooking system 102 is present in the cooking environment 100. If the sensed current does not satisfy the activated system current threshold, the inter-system controller 106 can determine that there is not another cooking system 102 present in the cooking environment 100. The process can be repeated with additional cooking systems 102 until the inter-system controller 106 determines the number of cooking systems 102 within the cooking environment. The activated system current threshold can be determined based on an amount of current that is drawn by cooking systems 102 when deactivated. The amount of current drawn by a cooking system when deactivated can be set during manufacturing or installation. For example, the cooking system 102 can be designed to draw a very small current to power some features of the cooking system 102, such as a clock, etc., even when the cooking system 102 is deactivated.

It will be understood that additional methods can be used to detect the presence of additional cooking systems 102. For example, in some embodiments, even when deactivated, the cooking systems 102 can be configured such that they are still able to respond to queries from other cooking systems 102. Accordingly, when a deactivated cooking system 102 receives a query, it can respond that it is present but deactivated.

In some embodiments, if the inter-system controller 106 determines that there are no other cooking systems 102 present in the cooking environment 100, it can alert a user. The inter-system controller 106 can alert the user via a display, e-mail, text, voicemail, other electronic communication, etc. Furthermore, in certain embodiments, such as when a cooking system 102 is configured to be in a power-sharing mode, if a cooking system 102 determines that there are no other cooking systems 102 present in the cooking environment 100, it can operate in a reduced mode and/or perform minimal functions. For example, in some embodiments, in the reduced mode, the heating/cooling element 110 of the cooking system 102 cannot be used. In this manner, the cooking systems 102 can provide safeguards in the event multiple cooking systems 102 are in the cooking environment 100 requesting power, but are unable to communicate with each other to safely allocate the power between them. In certain embodiments, the cooking systems 102 can be configured for stand-alone operation. In such embodiments, the cooking systems 102 can request power without ascertaining whether additional cooking systems 102 are present in the cooking environment 100.

Arbiter Selection

When the inter-system controller 106 determines that there is another cooking system 102 with an inter-system controller 106 in the cooking environment 100, the inter-system controllers 106 can communicate with each other to determine which inter-system controller 106 will manage the cooking environment 100. The selected inter-system controller 106 can be identified as the active inter-system controller 106 or as the arbiter. The arbiter can be selected randomly or based on one or more parameters.

In some embodiments, the arbiter can be selected based on a unique identifier that is associated with each cooking system 102 and/or inter-system controller 106. For example, each cooking system 102 in an environment 100 can share their unique identifier with each other. Based on the value of the unique identifiers, one of the inter-system controllers 106 can be selected as the arbiter. The unique identifier can be based on a number and/or a function. For example, the unique identifier can be the result of a hash function performed on a serial number of the cooking system.

Other methods can be used to select the arbiter as well. For example, in certain embodiments, the inter-system controller 106 that is closest to or farthest from a power source can be selected as the arbiter. In some embodiments, the arbiter can be selected as the inter-system controller 106 that has been on the longest or shortest amount of time, or the inter-system controller 106 that has the oldest version of firmware or the newest version of firmware. Any combination of the aforementioned embodiments can be used to select the arbiter.

Power Allocation Between Cooking Systems

Once selected, the arbiter can receive requests for power from the local controllers 108 and/or the inter-system controllers 106 of the other cooking systems 102 within the cooking environment 100. Depending on the location of the arbiter with respect to the other inter-system controllers 106 and the local controllers 108, the arbiter can receive requests for power via a local bus and/or the network 104. The requests for power can include an amount of energy/power, a percentage of power, a percentage of a time period, a gain factor, and/or a temperature of the product in the receptacle 110, etc., as will be described in greater detail below.

Based on the requests for power, the arbiter can determine a time allotment within a time period in which a heating/cooling element 112 is to receive electrical energy. The time period can be any period of time in which arbiter allocates power between one or more heating/cooling elements 112. In some embodiments, the time period can be one second, or approximately one second (e.g., 1 second+/−250 milliseconds (ms)). In certain embodiments, the time period can be less than or greater than one second, such as 1/10 of a second, 500 ms, 10 seconds, 1 minute, 5 minutes, etc. Furthermore, the time periods can be a fixed time period or can vary over time.

The time allotment can be the amount of time within the time period that is allocated to a particular heating/cooling element 112 for receiving electrical energy. The time allotment can be referred to as a numerical amount of time (e.g., number of milliseconds, seconds, or minutes) or as a percentage of the time period, similar to a duty cycle. For example, if the arbiter is allocating power between two heating/cooling elements 112 and the time period is one second, one heating/cooling element 112 can receive a time allotment of 60% of the time period (or 600 ms), while the second heating/cooling element 112 can receive a time allotment of 40% of the time period (or 400 ms). It will be understood that any variation in the allocation and/or time period can be used.

Figure 2:
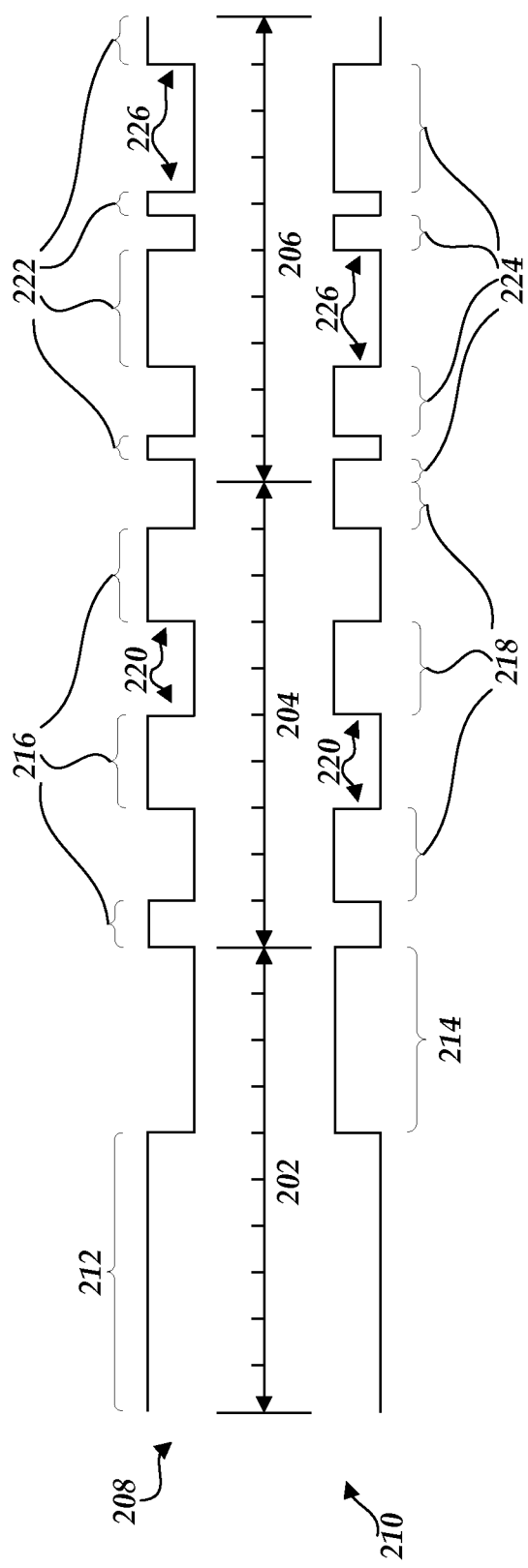
FIG. 2 is a graphical diagram of embodiments of various time allotments to heating/cooling elements over different time periods.

With reference to FIG. 2, the arbiter can allocate time allotments in a variety of ways. For example, the arbiter can allocate time allotments that are either continuous, or are interleaved with each other. In the illustrated embodiment of FIG. 2, three time periods 202, 204, 206 of one second each are presented, as well as sample control signals 208, 210 to allocate/de-allocate power to a first heating/cooling element (signal 208) and a second heating/cooling element (signal 210) of the first and second cooking systems 102.

In the illustrated embodiment, during the first time period 202, the arbiter allocates a first time allotment 212 of 600 ms (or 60%) to the first heating/cooling element and a second time allotment 214 of 400 ms (or 40%) to the second heating/cooling element. The time allotments 212, 214 are continuous such that the arbiter allocates the first 600 continuous milliseconds of the first time period 202 to the first heating/cooling element and the last 400 continuous milliseconds of the first time period 202 to the second heating/cooling element. Although illustrated as allocating the first portion of the first time period 202 to the first heating/cooling element and the second portion of the first time period 202 to the second heating/cooling element, it will be understood that the arbiter can allocate the time allotments 212, 214 in any order.

For the second time period 204, the first and second heating/cooling elements each receive a time allotment of 500 ms (or 50%) 216, 218, respectively, which are interleaved using approximately equally sized blocks of time 220 of 200 ms each (where available). Specifically, the arbiter allocates the time allotments 216, 218 as follows: 0-100 ms to the first heating/cooling element, 100-300 ms to the second heating/cooling element, 300-500 ms to the first heating/cooling element, 500-700 ms to the second heating/cooling element, 700-900 ms to the first heating/cooling element, and 900-1000 ms to the second heating/cooling element. It will be understood that the arbiter can interleave the time allotments 216, 218 at any desired granularity and in any order. For example, the arbiter can allocate the time between the heating/cooling elements at 10 ms blocks of time or smaller, at one second blocks of time or larger, or anywhere in between.

With continued reference to FIG. 2, during the third time period 206, the first heating/cooling element 112 receives a time allotment 222 of 450 ms (or 45%) and the second heating/cooling element 112 receives a time allotment 224 of 550 ms (or 55%), which are interleaved using different sized blocks of time 226. Thus, it will be understood that the arbiter can interleave the time allotments 222, 224 as desired. In certain embodiments, the arbiter can use time-division multiplexing to allocate the power between the heating/cooling elements 112. In some embodiments, the arbiter allocates the time between the heating/cooling elements 112 at intervals based on detected zero voltage conditions of the power source, which will be described in greater detail below.

As additional requests for power are received, the arbiter can determine the time allotments for future time periods. With reference again to FIG. 2, during the first time period 202, the arbiter can receive requests for power for the second time period 204 and/or the third time period 206. Based on the requests for power received during the first time period 202, the arbiter can automatically determine and allocate the time allotments for the second and third time periods 204, 206.

In some embodiments, the arbiter can determine and allocate time allotments for multiple time periods together. For example, if a request for power indicates that the temperature of the product satisfies a low/high temperature threshold (e.g., 65-85° F.), the arbiter can allocate time allotments of multiple time periods to the respective heating/cooling element 112 in order to accelerate the heating/cooling process.

The time allotments of the multiple time periods can be any size. For example, the arbiter can allocate time allotments of 60-80% or even 100% of the multiple time periods, as desired. Furthermore, the number of time periods allocated together can vary, as desired. In some embodiments, the number of time periods allocated together varies based on the temperature of the product. For example, in certain embodiments, a lower temperature of the product results in a greater number of time periods being allocated together. Similarly, in some embodiments, a higher temperature of the product results in a greater number of time periods being allocated together.

Power Allocation Scheme

In some embodiments, the arbiter can use a power allocation scheme to determine how power is to be allocated between the cooking systems 102. In some embodiments, the power allocation scheme can prioritize the various cooking systems 102 and/or heating/cooling elements 112 in the cooking environment 100. For example, in some embodiments, each cooking system 102 in the cooking environment can be assigned a priority level. The priority level can be based on a predetermined priority (e.g., a user indicating a cooking system 102 is the preferred system), or can be determined dynamically. For example, the arbiter can use the temperature of the products, the type of product requested, the location of a cooking system 102, the time of day, the workload of a cooking system, etc., or any combination thereof, to determine priority or priority levels. Furthermore, in some embodiments, the arbiter can give equal priority to the cooking systems 102.

As mentioned, the power allocation scheme can use the temperature of the product to prioritize power allocation between the heating/cooling elements 112. For example, if the arbiter determines that the temperature of the product in a receptacle 110 is within a threshold temperature range of a cooking temperature threshold, the arbiter can increase the priority of the cooking system and allocate additional power to the heating/cooling element 112 in order to decrease the amount of time for the product to satisfy the cooking temperature threshold. Similarly, if the difference between the temperature of the product and the cooking temperature threshold is large enough, the arbiter can the priority of the cooking system and allocate additional power to the heating/cooling element 112 in order to decrease the amount of time for the product to satisfy the cooking temperature threshold. For example, in some embodiments, the arbiter can allocate a time allotment of 100% of the time period to the heating/cooling element 112 to reduce the amount of time for the product to satisfy the cooking temperature threshold.

The cooking temperature threshold can be a specific temperature or a temperature range, and can change based on the product to be made. For example, for coffee, the cooking temperature threshold can be 200° F. or 197-205° F., for white tea the brewing threshold can be 170-175° F., for green tea the brewing threshold can be 175-180° F., for black tea the brewing threshold can be 195° F., for herbal tea the brewing threshold can be 210° F. It will be understood that the cooking temperature thresholds can be different than the examples given. In addition, the cooking temperature threshold for other food or liquid products, such as a cooking temperature threshold for a Panini, a dessert, other food or liquid product etc., can be different. Furthermore, it will be understood that the cooking temperature threshold can include a cooling temperature. For example, the cooking temperature threshold can be 35° F. for a drink or food product that is to be cooled.

In certain embodiments, the power allocation scheme can use the type of product being prepared to prioritize the cooking systems 102. For example, the arbiter can increase the priority level and allocate additional power to the heating/cooling element 112 that is used to heat/cool liquid for drinks that have a higher/lower cooking temperature threshold or a longer cooking time. By allocating additional power for these drinks, or other products, the cooking temperature threshold can be reached more quickly and the products can begin cooking sooner. In this manner, the cooking systems 102 can be configured such that different drinks can take approximately the same time to be completed.

In some embodiments, the power allocation scheme can use the location or frequency of use of a cooking system 102 to prioritize the cooking systems 102. For example, within a restaurant, a particular cooking system 102 may be used more frequently than other cooking systems 102 because of its location, accessibility to customers, or because the product that it makes is requested more frequently (e.g., the cooking system 102 makes a popular type of tea, coffee, or sandwich). Accordingly, based on the cooking system's 102 location or its frequency of use, it can be prioritized over the other cooking systems 102 (e.g., have a higher priority level). The location of the cooking systems 102 can be manually provided to the power allocation scheme and or can be determined dynamically, such as be using a location tracking device (e.g., GPS, radio communication, etc.).

Furthermore, the arbiter and/or inter-system controllers 106 can monitor the frequency of requests made for products that it makes. Based on the frequency, the arbiter can increase or decrease the cooking system's 102 priority level.

In some cases, the frequency of use of different cooking systems 102 may vary throughout the day. For example, a cooking system that is used extensively in the morning may not be used as frequently in the afternoon or evening. Accordingly, in certain embodiments, the arbiter can use the time of day to prioritize power allocation as part of the power allocation scheme. For example, during a first portion of the day, a cooking system 102 can have a higher priority than the other cooking systems 102. As the day progresses, the priority level of the cooking system 102 can be decreased while the priority level of another cooking system 102 can be increased.

In some embodiments, the arbiter can use the workload of a cooking system 102 to prioritize power allocation as part of the power allocation scheme. For example, the arbiter can determine whether a cooking system 102 has a queue of products or has recently dispensed a product. If the number of products requested from a particular cooking system 102 satisfies a queue threshold, the arbiter can increase the priority of the particular cooking system 102 until the queue is reduced to a second queue threshold. In addition, if the arbiter determines that a cooking system 102 recently dispensed a product, such as a coffee maker that has recently dispensed coffee, the arbiter can allocate additional power to the cooking system 102 to accelerate its recovery.

In addition to providing the priority, the power allocation scheme can indicate how a cooking system's 102 priority affects the power allocation. For example, in some embodiments, the power allocation scheme can indicate that a prioritized cooking system 102 is to receive all the power that it requests for the time period and any leftover power is to be allocated to any remaining cooking systems 102. For example, if a prioritized cooking system requests its maximum power for the time period (which in this example equates to 80% of the available power) and a second cooking system requests its maximum power for the time period (which in this example equates to 50% of the available power) the inter-system controller 106 can allocate 80% of the available power to the prioritized cooking system (satisfying its request) and allocate the remaining 20% of the available power to the second cooking system.

In some instances, after satisfying the prioritized cooking system, the leftover power can be allocated to the remaining cooking systems 102 equally or according to priority levels. For example, if after meeting the request of the prioritized cooking system there remains 40% of the available power to allocate between two remaining cooking systems, the arbiter can allocate the remaining 40% equally between the two remaining cooking systems or based on a priority level of the two remaining cooking systems.

In certain embodiments, rather than satisfying 100% of a prioritized cooking system's 102 request, the power allocation scheme can provide some other percentage to satisfy before the inter-system controller 106 attempts to satisfy the requests of the other cooking systems 102. For example, if there is insufficient power available to satisfy all the requests, the power allocation scheme can indicate that the inter-system controller 106 is to satisfy 75% (or some other percentage) of the prioritized cooking system's 102 request and treat the remaining 25% of the prioritized cooking system's 102 request equally with the requests of the other cooking systems 102. In other words, the inter-system controller 106 can attempt to satisfy the last 25% of the prioritized cooking system's 102 request and the requests from the other cooking systems 102 equally. In certain embodiments, the power allocation scheme can indicate that all cooking systems 102 are to be treated equally. For example, if the cooking systems 102 in the aggregate request 200% of the available power, the arbiter can allocate 50% of each cooking system's 102 request to each cooking system 102 (i.e., each cooking system 102 receives half of the amount of power that it requested). Additional and/or different power allocation schemes can be used as desired.

Energizing/De-Energizing the Heating/Cooling Elements

Once the power has been allocated by the arbiter, the inter-system controllers 106 can receive power allocation instructions from the arbiter. The instruction can be received via the network 104 and/or a local bus, depending on the location of the arbiter with respect to the inter-system controller 106. For example, for the inter-system controller 106 that also functions as the arbiter, the power allocation instructions can be available via the local bus, while the other inter-system controllers 106 can receive the power allocation instructions via the network 104.

In some embodiments, the power allocation instructions can be in the form of the time allotment described earlier. The time allotment can include information regarding the amount of time, as well as the placement of the time within the time period for which the heating/cooling element 112 is to receive electrical energy. In certain embodiments, the power allocation instructions or time allotment can be in the form of an array, buffer, run-length encoding, etc. The value in each element of the array or buffer can determine whether the inter-system controller 106 energizes or de-energizes the heating/cooling element 112 at, or during, an interval of the time period, described in greater detail below. For example, if the element contains a logical '1,' the inter-system controller 106 can energize the heating/cooling element 112 for the interval, or vice versa. If the element contains a logical '0,' the inter-system controller 106 can de-energize power to the heating/cooling element 112 for the interval, or vice versa. In some embodiments, rather than being either fully energized or de-energize during each interval, the power can be shared during each interval.

Using the received information, the inter-system controller 106 energizes or de-energizes the heating/cooling element 112. In some embodiments, the inter-system controller 106 energizes and de-energizes the heating/cooling element 112 by activating and deactivating a switch, such as a transistor (e.g., field-effect transistor (FET), bi-polar junction transistor (BJT), etc.), a solid state relay, a mechanical relay, a triode for alternating current (TRIAC), etc. The switch can be configured such that by activating the switch power is provided to the heating/cooling element 112, and by de-activating the switch the heating/cooling element 112 is deprived of power, or vice versa.

The inter-system controller 106 can transition from energizing/de-energizing the heating/cooling element 112 in a variety of ways. In some embodiments, the inter-system controller 106 divides the time period into a number of intervals, similar to time-division multiplexing. At each interval, the inter-system controller 106 can refer to the power allocation instructions to determine whether power is to be energized or de-energized to the heating/cooling element 112. In certain embodiments, the intervals can be based on a set time, such as 1 ms, 10 ms, 500 ms, etc., or on a percentage of the time period, such as 1%, 5%, 10%, 20%, etc., of the time period.

In some embodiments, the boundaries for transitioning between energizing/de-energizing the heating/cooling element 112 can coincide with a zero voltage condition of the power source. For example, the inter-system controller 106 can detect each time an AC power source crosses zero or a common-mode voltage, which can also be referred to as zero voltage conditions. Upon detecting a zero voltage condition, the inter-system controller 106 can transition from either energizing or de-energizing the heating/cooling element 112 based on the received power allocation instructions from the inter-system controller 106. For example, with a 60 Hz AC source, the inter-system controller 106 can detect approximately 120 zero voltage conditions each second. Accordingly, using the 60 Hz AC source with a time period of one second, the inter-system controller 106 can transition from energizing or de-energizing the heating/cooling element 112 at a rate of 120 times per time period (or have 120 intervals per time period).

Advantageously, using the zero voltage condition of the power source as boundaries for the intervals can improve synchronization between the cooking systems 102 because all the cooking systems 102 see the zero voltage condition at the same time or at approximately the same time. In some embodiments, this can reduce or eliminate the need for more complicated synchronization techniques. In addition, using the zero voltage condition of the power source as boundaries for the intervals can advantageously improve system efficiency by reducing power dissipation as the switches transition from being activated to being deactivated and vice versa.

Safety Management

In addition, the inter-system controller 106 can be used to monitor other aspects of the cooking systems 202. For example, the inter-system controller 106 can monitor the amount of current being drawn or power being used by individual cooking systems 102 or heating/cooling elements 112. In some embodiments, a current sensor operatively coupled to the power line of one or more cooking systems 102 can sense the amount of current drawn by a particular cooking system 102. In the event that the amount of current drawn satisfies a safety current threshold, the inter-system controller 106 can de-allocate power to the cooking system 102 or heating/cooling element 112, and/or alert a user regarding a potential hazard. The inter-system controller 106 can alert the user via a display, e-mail, text, voicemail, other electronic communication, etc. The inter-system controllers 106 can also perform additional functions, as described in greater detail in U.S. application Ser. No. 13/684,062, filed Nov. 21, 2012, entitled COOKING MANAGEMENT, incorporated herein by reference in its entirety.

Local Controller

With continued reference to FIG. 1, the local controller 108 can be used for low-level functionality, such as, but not limited to, detecting power consumption of the heating/cooling element 112, measuring the temperature of product within the receptacle 110, determining an amount of power to request for the heating/cooling element 112, and requesting the power for the heating/cooling element 112, etc. The local controller 108 can be implemented using a microcontroller, microprocessor, field programmable gate array (FPGA), programmable logic device (PLD), and the like. As described earlier, the local controller 108 can be separate and distinct from the inter-system controller 106, or it can be implemented using the same components as the inter-system controller 106. In addition, it will be understood that, in certain embodiments, the local controller 108 can implement the functions described above with respect to the inter-system controller 106 or vice versa.

In some embodiments, the local controller 108 can receive the temperature of the product in the receptacle 110 from a temperature sensor that is thermally coupled to the receptacle 110 and/or the liquid, and compare the received temperature with a cooking temperature threshold. The temperature sensor can be implemented using a thermometer, thermistor, infrared sensor, thermocouple, etc. Based on the comparison of the measured temperature and the cooking temperature threshold, the local controller 108 can request power from the inter-system controller 106. In some embodiments, the amount of power requested by the local controller 108 is proportional to the difference between the cooking temperature threshold and the measured temperature. In other words, as the difference between the cooking temperature threshold and the measured temperature decreases, the amount of power requested by the local controller 108 decreases, and vice versa.

As mentioned previously, the request for power can include an amount of energy/power, a percentage of power, a percentage of the time period, a gain factor, a temperature of the liquid in the receptacle 110, etc. The amount of energy/power can include the amount of power desired by the heating/cooling element 112. For example, the amount of power/energy can include a calculated amount of energy to heat a volume of liquid to a certain temperature or an amount of power/energy for the time period. The percentage of power can include a percent of the total power available to the cooking environment 100 or the power available to the heating/cooling elements 112. For example, the local controller 108 can request 0-100% of the available power. In some embodiments, the local controller 108 can request 100% of the available power based on the liquid temperature in the receptacle 110 satisfying a low temperature threshold. The percentage of the time period can be a percentage of the total time period to receive power or energy. The gain factor can be based on the difference between the cooking temperature threshold and the measured temperature, as well as a gain constant. A large gain constant can result in a faster convergence of the measured temperature to the cooking temperature threshold. A small gain constant can result in a slower response time, but with the controller being less susceptible to noise. In some embodiments, the gain factor can form part of a proportional-integral-derivative (PID) control loop that takes into account any one or a combination of present error, the accumulation of past error and a prediction of future error to converge the measured temperature to the cooking temperature threshold.

It will be understood that different control loops and configurations can be used as well. For example, in some embodiments, the local controller 108 can send multiple values in the power request, such as a maximum power and a minimum power. The maximum power can include the amount of power requested if available, and the minimum power can include the amount of power required by the cooking system 102. Accordingly, the arbiter can allocate the maximum power requested if it is available, but ensure that at least the minimum power requested is allocated to the cooking system 102.

In addition, the local controller 108 can determine the amount of current drawn or power used by the heating/cooling element 112 and/or the cooking system 102. In some embodiments, a current sensor operatively coupled to the power line can sense the amount of current being drawn and transmit the information to the local controller 108. In turn, the local controller 108 can transmit the determined current being drawn or power used to the inter-system controller 106. If the inter-system controller 106 determines that a safety current threshold has been satisfied, it can de-energize the heating/cooling element 112.

One skilled in the relevant art will also appreciate that the components and configurations provided in FIG. 1 are illustrative in nature. Accordingly, additional or alternative components and/or configurations can be utilized. For example, in some embodiments, the cooking systems 102 can include one or more temperature sensors that measure the temperature of the liquid in the receptacle 110, one or more fluid-level sensors to measure the amount of fluid in the receptacles 110, one or more flow meters to measure the amount of fluid entering or exiting the receptacles 110, etc.

In certain embodiments, one or more cooking systems 102 can include multiple heating/cooling elements 112, and can request power for each of the heating/cooling elements 112 individually or as a whole. Furthermore, the power allocation instructions can identify how power is to be allocated between the different heating/cooling elements 112. For example, in some embodiments, the power allocation instructions can dictate that only one heating/cooling element 112 is to receive power, while the other heating/cooling elements 112 of a cooking system 102 are not. In certain embodiments, the power allocation instructions can dictate that all of the heating/cooling elements 112 are to receive all the power they requested or a fraction of the power they requested, etc.

In some embodiments, the cooking systems 102 can use multiple power sources, such as, for example, multiple AC phases. In certain embodiments, the various cooking systems 102 can provide requests for power to the arbiter for a specific phase of the AC power. The arbiter can treat the different phases as different power sources and allocate them based on the requests, as described above. In certain embodiments, the various cooking systems 102 can simply request power, and the arbiter can determine from which phase the cooking system 102 receives power. The arbiter can select the phase in a variety of ways. For example, in some embodiments, the arbiter can select the phase with the most capacity. In certain embodiments, the arbiter can allocate one phase until its capacity is reached before allocating a second phase, and so on. Furthermore, in some embodiments, a separate arbiter can be selected for each power source or phase.

Routines

Figure 3:
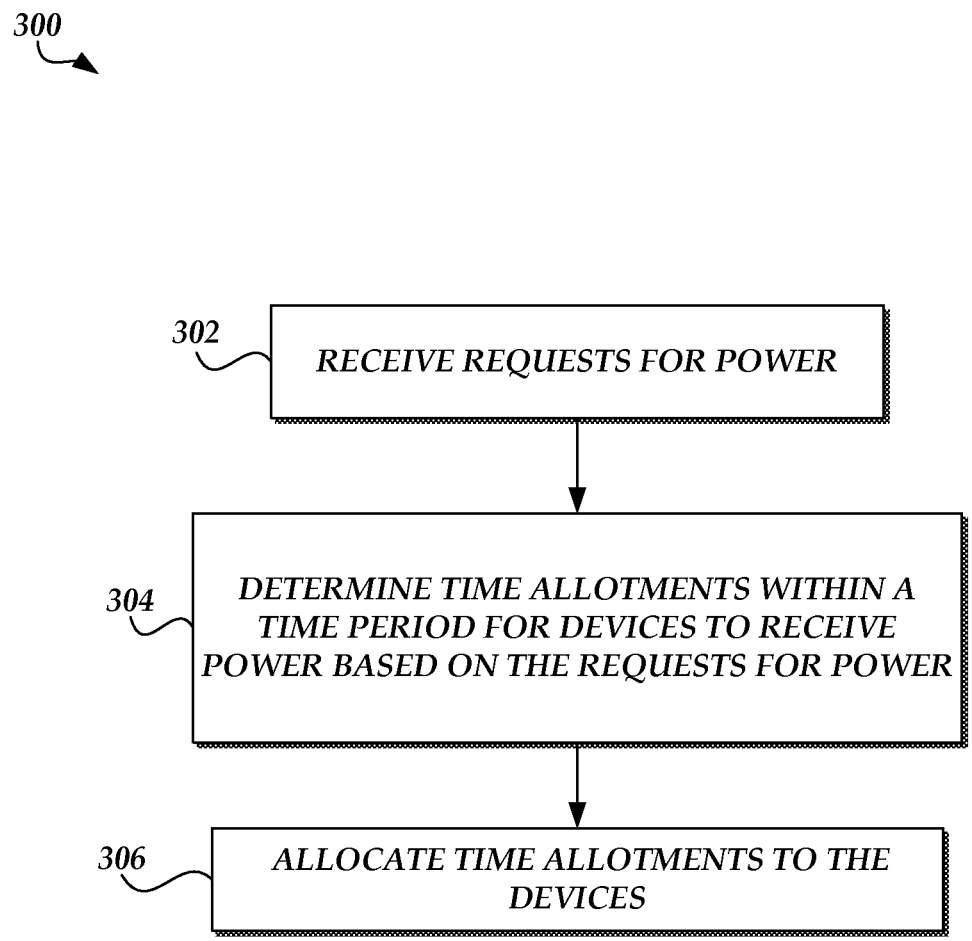
FIG. 3 is a flow diagram illustrative of an embodiment of a routine implemented by a controller for allocating power between the cooking systems.

FIG. 3 is a flow diagram illustrative of an embodiment of a routine 300 for allocating power to heating/cooling elements 112. One skilled in the relevant art will appreciate that the elements outlined for routine 300 can be implemented by one or more computing devices/components that are associated with the cooking environment 100, such as the cooking system 102, the inter-system controller 106 and/or the local controller 108. For ease of reference, routine 300 has been logically associated as being generally performed by the inter-system controller 106. However, the following illustrative embodiments should not be construed as limiting. For example, one skilled in the relevant art will appreciate that the elements outlined for routine 300 can be used by any type of system for allocating power between multiple devices.

At block 302, the inter-system controller 106 receives requests for power from the local controllers 108, the cooking systems 102, or some other device. As discussed previously, the requests for power can include a numerical power/energy, a percentage of power, a gain factor, and/or an indication of a product's temperature. In some embodiments, the requests for power include the amount of power requested for a device, such as heating/cooling element 112 or any device that might require power, for a time period. In certain embodiments, the requests are individually received for each distinct time period.

At block 304, based at least on the requests for power, the inter-system controller 106 determines the time allotments for the device within the time period. In some embodiments, a power allocation scheme, described in greater detail above, can be used by the inter-system controller 106 to determine how power is to be allocated between the devices during the time period. In certain embodiments, the power allocation scheme can indicate that, if possible, the inter-system controller 106 is to satisfy the requests from the different local controllers 108. For example, if each local controller 108 requests 50% of the available power, the inter-system controller 106 is to satisfy each request. Similarly, the inter-system controller 106 can satisfy all the requests if the sum of all the requests from the local controllers 108 is less than or equal to the total available power (e.g., three local controllers 108 each requesting 30% of the available power or two local controllers 108 requesting 70% and 30% of the available power, respectively). As described previously, if the inter-system controller 106 cannot satisfy all of the requests for the time period, the power allocation scheme can identify how the power is to be allocated between the devices 112 during the time period.

At block 306, the inter-system controller 106 allocates the time allotments to the devices. As described in greater detail above, the time allotments can be allocated as either continuous blocks of time or interleaved as desired. In an embodiment that includes two devices, the inter-system controller 106 can allocate a first time allotment within a time period to the first device (e.g., the heating/cooling element 112 of the first cooking system 102) and a second time allotment within the time period to the second device (e.g., the heating/cooling element 112 of the second cooking system 102). For example, if the time period is two seconds and the inter-system controller 106 has determined that each time allotment is to be 50% of the time period, the inter-system controller 106 can allocate the first second to the first device and the second second to the second device, or vice versa. As mentioned previously, the time allotments can be interleaved. Thus, with continued reference to the example, the inter-system controller 106 can allocate the time as follows: 0-500 ms to the first device, 500-1000 ms to the second device, 1000-1500 ms to the first device, and 1500-2000 ms to the second device 102. Similarly, the inter-system controller 106 can allocate time allotments between three or more devices as desired. In addition, it will be understood that the time allotments can be interleaved at any desired granularity.

Additional, fewer, or different blocks can be used to implement the process 300 without departing from the spirit and scope of the description. For example, in some embodiments, the inter-system controller 106 can receive indications that the devices or cooking systems 102 are active. In some embodiments, if only one device is active, the inter-system controller 106 can satisfy all the requests for power from that device without receiving requests for power from any other devices. In certain embodiments, the inter-system controller 106 can detect a zero voltage condition of a power source, as described previously, and allocate/de-allocate power to the device based on the detection of the zero voltage condition.

Figure 4:
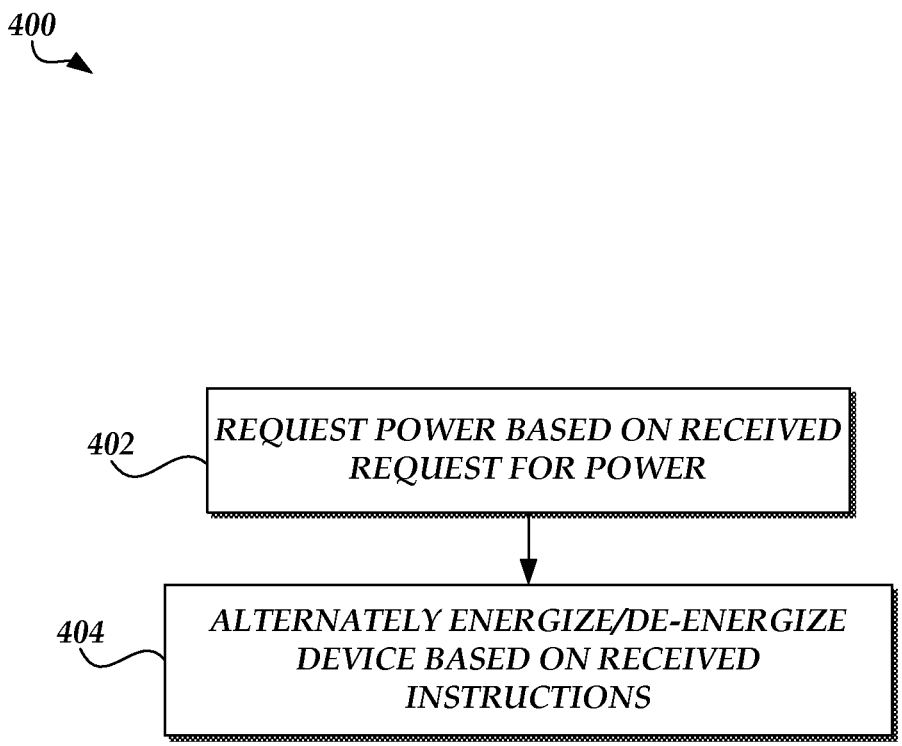
FIG. 4 is a flow diagram illustrative of an embodiment of a routine implemented by a controller for allocating and de-allocating power to a cooking system.

FIG. 4 is a flow diagram illustrative of an embodiment of a routine 400 implemented for requesting power. One skilled in the relevant art will appreciate that the elements outlined for routine 400 can be implemented by one or more computing devices/components that are associated with the cooking environment 100, such as the cooking system 102, the inter-system controller 106 and/or the local controller 108. For ease of reference, routine 400 has been logically associated as being generally performed by the inter-system controller 106. However, the following illustrative embodiments should not be construed as limiting. For example, one skilled in the relevant art will appreciate that the elements outlined for routine 400 can be used by any type of system for alternately energizing/de-energizing a device.

At block 402, the inter-system controller 106 requests power based at least on a request for power received from a local controller 108 or a sensor. As discussed previously, the request for power can include, but is not limited to, an amount of energy, an amount of power, a percentage of power, a percentage of the time period, a gain factor, a temperature of a product in the receptacle 110, and/or another parameter of the product etc. In some embodiments, the request for power is based on a difference between the measured product temperature and a cooking temperature threshold.

At block 404, the inter-system controller 106 alternately energizes/de-energizes the device, such as the heating/cooling element 112, based at least on received power allocation instructions. In some embodiments, the power allocation instructions are received via a local bus or network from an arbiter that is located in the same cooking system 102 as the inter-system controller 106 (or is the inter-system controller 106). In certain embodiments, the power allocation instructions are received via a network 104 from an inter-system controller 106 that is located in a separate and distinct device, such as another cooking system 102 or stand-alone controller.

As described previously, the power allocation instructions can include a time allotment for the device. The time allotment can include information regarding the amount of time, as well as the placement of the time within the time period for which the device is to receive electrical energy. In certain embodiments, the time allotment can include a buffer, an array, and/or a run-length encoding, etc. Based on the value in the buffer or array, the inter-system controller 106 can energize or de-energize the device. For example, if the value in the buffer or array includes a logical '1,' the inter-system controller 106 can energize the device, or vice versa. If the value includes a logical '0,' the inter-system controller 106 can de-energize the device, or vice versa. It will be understood that a variety of methods can be used to indicate whether the inter-system controller 106 is to energize or de-energize the heating/cooling element 112.

As described previously, in some embodiments, the inter-system controller 106 energize/de-energizes the device based at least upon the detection of a zero voltage condition of the power source. For example, each time an AC power source crosses zero (or a common-mode voltage), the inter-system controller 106 energizes or de-energizes the device based on the received power allocation instructions. Accordingly, in some embodiments, each value within the buffer or array can be representative of the time period between two detected zero voltage conditions of the power source. Additional, fewer, or different blocks can be used to implement the routine 400 without departing from the spirit and scope of the description.

Figure 5:
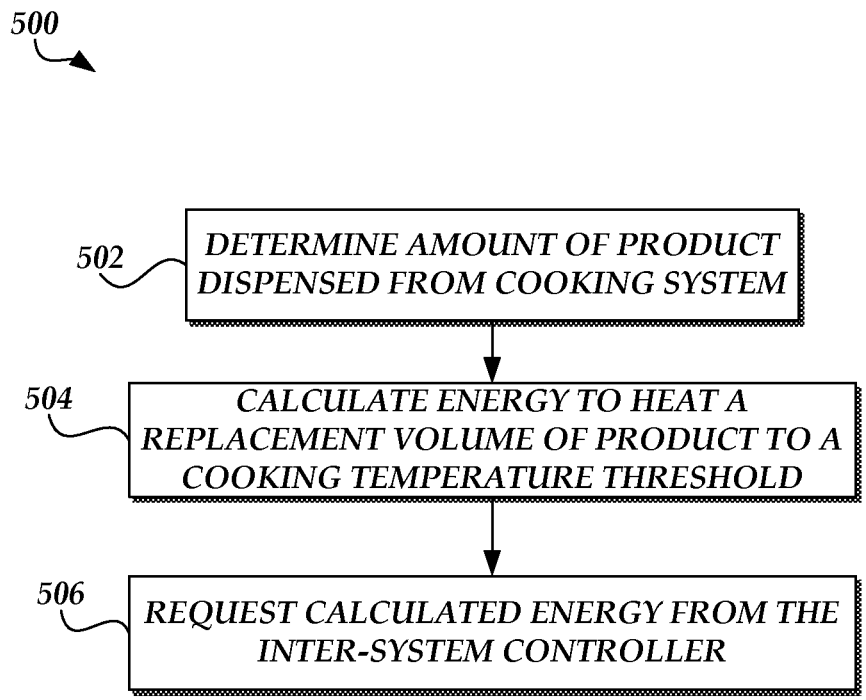
FIG. 5 is a flow diagram illustrative of an embodiment of a routine implemented by a controller for providing a calculated amount of energy to a cooking system.

FIG. 5 is a flow diagram illustrative of an embodiment of a routine 500 for automatically allocating power to a device, such as a heating/cooling element 112 or a cooking system 102. One skilled in the relevant art will appreciate that the elements outlined for routine 500 can be implemented by one or more computing devices/components that are associated with the cooking environment 100, such as the cooking system 102, the inter-system controller 106 and/or the local controller 108. For ease of reference, routine 500 has been logically associated as being generally performed by the local controller 108. However, the following illustrative embodiments should not be construed as limiting.

At block 502, the local controller 108 determines an amount of product that has been dispensed from a receptacle 110 of a cooking system 102. The local controller 108 can determine the amount of product dispensed from the receptacle 110 based at least on data received from the local controller 108 and/or data received from a sensor associated with the receptacle 110. The sensor can be a fluid-level sensor, such as a float sensor, a flow meter, or other sensor capable of detecting a reduction of fluid in the receptacle 110 or a flow of fluid into the receptacle 110. In some embodiments, the local controller 108 determines the amount of product that has been dispensed based at least on a size of a product requested. For example, if a user selects a 16 oz. drink, then the local controller 108 can determine that 16 oz. of fluid has been dispensed from the receptacle 110.

At block 504, the local controller 108 calculates an amount of energy to heat a replacement volume of product to satisfy a cooking temperature threshold. The replacement volume of product can include the product to be added to the receptacle 110 after at least some of the product in the receptacle 110 has been dispensed (e.g., a volume of water after water has been dispensed). For example, in some embodiments, the replacement volume of product can be added to the receptacle via an inlet.

In certain embodiments, the replacement volume of product can be equal to, or approximately equal to, the amount of product dispensed from the receptacle 110, or can be a different volume. For example after dispensing 16 oz. of water, the local controller 108 can determine that the receptacle 110 is capable of holding an additional 32 oz. of water. Thus, the replacement volume can be greater than, equal to, or less than the dispensed volume. In certain embodiments, the cooking temperature threshold can be determined based on the type of product to be made, as described previously.

In addition, the local controller 108 can estimate the temperature of the replacement volume or measure the temperature of the replacement volume. In certain embodiments, the estimated temperature can be based on a user input and/or an average temperature of the product at room temperature or in a particular location. In some embodiments, to measure the temperature of the replacement volume of product, the cooking system 102 can include a temperature sensor at an inlet of the receptacle 110. The temperature sensor can measure the replacement volume of product as it passes the inlet.

Based on the heating characteristics of the product (e.g., the amount of energy required to heat a volume of the product by one degree), the determined replacement volume of product, and the difference between the cooking temperature threshold and the measured/estimated temperature of the replacement volume, the local controller 108 can determine the amount of energy to heat the replacement volume to satisfy the cooking temperature threshold.

At block 506, the local controller 108 requests the calculated energy from the inter-system controller 108 and/or the arbiter. As the calculated energy may exceed the amount of available energy within the time period, the local controller 108 can request 100% (or some other determined amount) of the available energy over multiple time periods until the calculated energy is received. For example, following each time period, the local controller 108 can compare the total amount of energy received since the request was made with the calculated energy requested. If the total amount of energy received is less than the calculated energy, the local controller 108 can continue to request 100% of the available energy. During this time, the local controller 108 can ignore the temperature of the product. Once the amount received equals the calculated energy, the local controller can begin requesting power based on the measured temperature.

As described earlier, the arbiter allocates power between the cooking systems based on a power allocation scheme. Accordingly, in some cases, the arbiter may allocate less than the amount requested by the local controller 108 during a given time period. By comparing the total amount of energy received since the request was made with the calculated energy, the local controller 108 is not affected by receiving less than the requested amount because it will simply add whatever amount of energy was received to the total amount and compare the sum with the calculated energy.

In certain embodiments, the local controller 108 can disregard the temperature of the product unless an upper temperature threshold, which can be higher than the cooking temperature threshold, is satisfied by the product in the cooking system 102. For example, if the cooking temperature threshold is 190° F., the upper temperature threshold can be 197° F. Accordingly, if the temperature is less than 197° F., the local controller 108 can ignore the temperature. However, if the measured temperature reaches or exceeds 197° F., the local controller 108 can ignore any remainder of the calculated energy that has not be received and begin requesting power based on the temperature of the product.

Additional, fewer, or different blocks can be used to implement the routine 500 without departing from the spirit and scope of the description. For example, the local controller 108 can detect when the receptacle 110 begins dispensing the product.

Furthermore, in embodiments where the routine 500 is implemented by the inter-system controller 106, the inter-system controller 106 can allocate the calculated energy to the cooking system 102 (e.g., to the heating/cooling element 112 of the cooking system 102). As the calculated energy may exceed the amount of available energy within the time period, the inter-system controller 106 can allocate multiple time periods in order to provide the calculated energy to the cooking system 102.

In some embodiments, the inter-system controller 106 can provide 100% of the available power to the cooking system 102. In certain embodiments, the inter-system controller 106 allocates less than 100% of the available power to the cooking system 102. For example, based on the power allocation scheme, the inter-system controller 106 can determine that no more than a threshold percentage of the available power is to be allocated to the cooking system 102 for more than a threshold number of time periods. The threshold percentage can be any percentage, and the threshold number of timer periods can be any number determined by the user and/or the power allocation scheme. For example, the threshold percentage can be 70% or 80%, and the threshold number of time periods can be 5, 10, or 20 time periods, etc. In some embodiments, where the threshold percentage is less than 100%, the remaining available power can be used to allocate power to other cooking systems 102.

In some embodiments, once the calculated energy is allocated, the inter-system controller 106 can disregard requests for power and/or the product temperature measurements until the calculated energy has been provided to the cooking system 102. In such embodiments, the inter-system controller 106 can disregard requests for power from the cooking system 102 and/or other cooking systems 102. As mentioned previously, if a threshold percentage is less than 100%, the inter-system controller 106 can disregard requests for power from the cooking system 102, while allocating the remaining available power to other cooking systems 102 as requested. In certain embodiments, the inter-system controller 106 can disregard the requests for power unless an upper temperature threshold, which can be higher than the cooking temperature threshold, as discussed previously.

Various non-limiting, example embodiments of the disclosure can be described in view of the following clauses:

Clause 1. A system, comprising:
a plurality of cooking systems, comprising a first cooking system and a second cooking system, communicatively and electrically coupled with each other; and
a controller configured to:
receive an indication that the first cooking system is active;
receive an indication that the second cooking system is active;
receive indications of a first water temperature corresponding to a temperature of water in the first cooking system and a second water temperature corresponding to a temperature of water in the second cooking system;
determine a first time allotment within a predetermined time period for a first heating/cooling element of the first cooking system to receive electrical energy and a second time allotment within the predetermined time period for a second heating/cooling element of the second cooking system to receive electrical energy based at least in part on the indications of the first water temperature and the second water temperature; and
allocate the first time allotment to the first cooking system and the second time allotment to the second cooking system, wherein the first heating/cooling element receives electrical energy during the first time allotment and the second heating/cooling element receives electrical energy during the second time allotment.

Clause 2. The system of claim 1, wherein the indications of the first water temperature and the second water temperature comprise measured water temperatures.

Clause 3. The system of claim 1, wherein the indications of the first water temperature and the second water temperature comprise requests for power based at least on a difference between a cooking temperature threshold and each of the indications of the first water temperature and the second water temperature.

Clause 4. A system, comprising:
a plurality of cooking systems, comprising a first cooking system and a second cooking system communicatively and electrically coupled with each other, wherein each cooking system of the plurality of cooking systems comprises a receptacle and a heating/cooling element; and
a controller configured to:
receive requests for power from the first cooking system and the second cooking system;
determine a first time allotment within a time period for the heating/cooling element of the first cooking system and a second time allotment within the time period for the heating/cooling element of the second cooking system to receive electrical energy based at least on the requests for power; and
allocate the first time allotment to the first cooking system and the second time allotment to the second cooking system.

Clause 5. The system of Clause 4, wherein the controller is further configure to:
receive an indication that the first cooking system is active; and
receive an indication that the second cooking system is active.

Clause 6. The system of any of Clauses 4 and 5, wherein the controller is further configured to:
detect a zero voltage condition of a power source; and
based at least upon the detecting the zero voltage condition, allocate electrical energy to at least one of the first cooking system and the second cooking system and de-allocate electrical energy to the other of the at least one of the first cooking system and the second cooking system.

Clause 7. The system of any of Clauses 4-6, wherein the first time allotment comprises a first continuous block of time, and the second time allotment comprises a second continuous block of time.

Clause 8. The system of any of Clauses 4-6, wherein the first time allotment is interleaved with the second time allotment.

Clause 9. The system of any of Clauses 4-8, wherein the first time allotment transitions to the second time allotment based at least on a detection of a zero voltage condition of a power source.

Clause 10. The system of any of Clauses 4-9, wherein requests for power are based at least on a difference between a cooking temperature threshold and each of a temperature of water in the first cooking system and a temperature of water in the second cooking system.

Clause 11. The system of any of Clauses 4-10, wherein the first cooking system comprises at least one of a coffee maker, a skillet, a microwave oven, a toaster oven, and a hot plate and the second cooking system comprises a different one of at least one the coffee maker, the skillet, the microwave oven, the toaster oven, and the hot plate.

Clause 12. The system of any of Clauses 4-11, wherein the receptacle comprises a tank of water.

Clause 13. The system of Clause any of Clauses 4-12, wherein the controller is further configured to determine the first time allotment and the second time allotment based at least on a power allocation scheme.

Clause 14. The system of any of Clauses 4-13, wherein the controller is further configured to determine the first time allotment and the second time allotment based at least on a location of the first cooking system and the second cooking system.

Clause 15. The system of any of Clauses 4-14, wherein the controller is further configured to determine the first time allotment and the second time allotment based at least on a frequency of use of the first cooking system and the second cooking system.

Clause 16. The system of any of Clauses 4-15, wherein the controller is further configured to determine the first time allotment and the second time allotment based at least on a priority level of the first cooking system and the second cooking system.

Clause 17. The system of any of Clauses 4-16, wherein the controller is further configured to determine the first time allotment and the second time allotment based at least on a time of day.

Clause 18. The system of any of Clauses 4-17, wherein the controller is further configured to determine the first time allotment and the second time allotment based at least on a workload of the first cooking system and the second cooking system.

Clause 19. A method of allocating power between a plurality of cooking systems, the method comprising:

receiving requests for power from a first cooking system and a second cooking system;

determining a first time allotment within a time period for a heating/cooling element of the first cooking system and a second time allotment within the time period for a heating/cooling element of the second cooking system to receive electrical energy based at least on the requests for power; and allocating the first time allotment to the first cooking system and the second time allotment to the second cooking system.

Clause 20. The method of Clause 19, further comprising:

receiving an indication that the first cooking system is active; and receiving an indication that the second cooking system is active.

Clause 21. The method of any of Clauses 19 and 20, further comprising:

detecting a zero voltage condition of a power source; and based at least upon the detecting the zero voltage condition, allocating electrical energy to at least one of the first cooking system and the second cooking system and de-allocating electrical energy to the other of the at least one of the first cooking system and the second cooking system.

Clause 22. The method of any of Clauses 19-21, wherein the first time allotment comprises a first continuous block of time, and the second time allotment comprises a second continuous block of time.

Clause 23. The method of any of Clauses 19-21, wherein the first time allotment is interleaved with the second time allotment.

Clause 24. The method of any of Clauses 19-23, wherein the first time allotment transitions to the second time allotment based at least on a detection of a zero voltage condition of a power source.

Clause 25. The method of any of Clauses 19-24, wherein requests for power are based at least on a difference between a cooking temperature threshold and each of a temperature of water in the first cooking system and a temperature of water in the second cooking system.

Clause 26. The method of Clause any of Clauses 19-25, further comprising determining the first time allotment and the second time allotment based at least on a power allocation scheme.

Clause 27. The method of any of Clauses 19-26, further comprising determining the first time allotment and the second time allotment based at least on a location of the first cooking system and the second cooking system.

Clause 28. The method of any of Clauses 19-27, further comprising determining the first time allotment and the second time allotment based at least on a frequency of use of the first cooking system and the second cooking system.

Clause 29. The method of any of Clauses 19-28, further comprising determining the first time allotment and the second time allotment based at least on a priority level of the first cooking system and the second cooking system.

Clause 30. The method of any of Clauses 19-29, further comprising determining the first time allotment and the second time allotment based at least on a time of day.

Clause 31. The method of any of Clauses 19-30, further comprising determining the first time allotment and the second time allotment based at least on a workload of the first cooking system and the second cooking system.

Clause 32. A cooking system communicatively coupled with another cooking system, the cooking system comprising:

a receptacle configured to hold a product;

a heating/cooling element thermally coupled to the product;

a temperature sensor thermally coupled to the product and configured to measure the temperature of the product in the receptacle; and a first controller configured to:

request power from a second controller based at least on the measured temperature, receive power allocation instructions that identify a time allotment within a time period in which the heating/cooling element receives electrical energy, and alternately allocate and de-allocate power to the heating/cooling element during the time period based at least on the power allocation instructions.

Clause 33. The cooking system of Clause 32, wherein the power allocation instructions indicate an amount of time and a location of the time within the time period in which the heating/cooling element receives electrical energy.

Clause 34. The cooking system of any of Clauses 32 and 33, wherein the power allocation instructions indicate that less power than the requested power is allocated to the heating/cooling element.

Clause 35. The cooking system of any of Clauses 32-34, wherein the product comprises a liquid.

Clause 36. The cooking system of any of Clauses 32-35, wherein the controller is configured to request the amount of power based at least on a difference between the measured temperature and a cooking temperature threshold.

Clause 37. The cooking system of any of Clauses 32-36, wherein to alternately allocate and de-allocate the power to the heating/cooling element, the controller is further configured to:

detect a zero voltage condition of a power source; and based at least on detection of the zero voltage condition, allocate power to the heating/cooling element.

Clause 38. The cooking system of any of Clauses 32-37, wherein to alternately allocate and de-allocate the power to the heating/cooling element, the controller is further configured to:

detect a zero voltage condition of a power source; and based at least on detection of the zero voltage condition, de-allocate power to the heating/cooling element.

Clause 39. A method for energizing a heating/cooling element of a cooking system, the method comprising:

requesting power from a controller based at least on a measured temperature of a product, receiving power allocation instructions that identify a time allotment within a time period in which a heating/cooling element receives electrical energy, and alternately allocating and de-allocating power to the heating/cooling element during the time period based at least on the power allocation instructions.

Clause 40. The method of Clause 39, wherein the power allocation instructions indicate an amount of time and a location of the time within the time period in which the heating/cooling element receives electrical energy.

Clause 41. The method of any of Clauses 39 and 40, wherein the power allocation instructions indicate that less power than the requested power is allocated to the heating/cooling element.

Clause 42. The method of any of Clauses 39-41, wherein the product comprises a liquid.

Clause 43. The method of any of Clauses 39-42, further comprising requesting the amount of power based at least on a difference between the measured temperature and a cooking temperature threshold.

Clause 44. The method of any of Clauses 39-43, wherein alternately allocating and de-allocating the power to the heating/cooling element comprises:
  detecting a zero voltage condition of a power source; and
  based at least on detecting the zero voltage condition, allocating power to the heating/cooling element.

Clause 45. The method of any of Clauses 39-44, wherein alternately allocating and de-allocating the power to the heating/cooling element comprises:
  detecting a zero voltage condition of a power source; and
  based at least on detection of the zero voltage condition, de-allocating power to the heating/cooling element.

Clause 46. A cooking system comprising:
  a receptacle configured to hold a product;
  a heating/cooling element thermally coupled to the product; and
  a temperature sensor thermally coupled to the product and configured to measure the temperature of the product in the receptacle;
  a controller configured to:
  determine an amount of the product dispensed from the receptacle;
  calculate an energy amount to heat a replacement volume of product that corresponds to the amount of the product dispensed; and
  repeatedly request power from a controller over a plurality of time periods until the calculated energy amount is received.

Clause 47. The cooking system of Clause 46, wherein the power is a maximum power available.

Clause 48. The cooking system of any of Clauses 46 and 47, wherein the controller is further configured to compare a total amount of energy received since an initial request for power with the calculated energy amount prior to requesting power for a subsequent time period.

Clause 49. The cooking system of Clause 48, wherein the controller is further configured to request the power from the controller upon determining that the total amount of energy received since the initial request for power is less than the calculated energy amount.

Clause 50. The cooking system of any of Clauses 46-49, wherein the controller is configured to calculate the energy amount based at least on the difference between a temperature of the replacement volume and a cooking temperature threshold.

Clause 51. The cooking system of any of Clauses 46-50, wherein the temperature of the replacement volume is an estimated temperature.

Clause 52. The cooking system of any of Clauses 46-51, wherein the temperature of the replacement volume is a measured temperature.

Clause 53. The cooking system of any of Clauses 46-52, wherein the replacement volume is approximately equal to the amount of the product dispensed.

Clause 54. The cooking system of any of Clauses 46-53, wherein the controller is further configured to:
  receive the measured temperature of the product in the receptacle; and
  disregard the measured temperature of the product until the calculated energy amount is received.

Clause 55. A method of allocating power to at least one cooking system of a plurality of cooking systems, the method comprising:
  determining an amount of product dispensed from the;
  calculating an energy amount to heat a volume of water that corresponds to the amount of water reduced; and
  requesting power from a controller over a plurality of predetermined time periods until the calculated energy amount is received.

Clause 56. The method of Clause 55, wherein the power is a maximum power available.

Clause 57. The method of any of Clauses 55 and 56, further comprising comparing a total amount of energy received since an initial request for power with the calculated energy amount prior to requesting power for a subsequent time period.

Clause 58. The method of Clause 57, further comprising requesting the power from the controller upon determining that the total amount of energy received since the initial request for power is less than the calculated energy amount.

Clause 59. The method of any of Clauses 55-58, further comprising calculating the energy amount based at least on the difference between a temperature of the replacement volume and a cooking temperature threshold.

Clause 60. The method of any of Clauses 55-59, wherein the temperature of the replacement volume is an estimated temperature.

Clause 61. The method of any of Clauses 55-60, wherein the temperature of the replacement volume is a measured temperature.

Clause 62. The method of any of Clauses 55-61, wherein the replacement volume is approximately equal to the amount of the product dispensed.

Clause 63. The method of any of Clauses 55-62, further comprising:
  receiving the measured temperature of the product in the receptacle; and
  disregarding the measured temperature of the product until the calculated energy amount is received.

ADDITIONAL EMBODIMENTS

Although described with respect to a cooking system and a cooking environment, it will be understood that the embodiments described herein can have wide applicability in systems that allocate power between devices. Furthermore, it will also be understood that different parameters and measurement can be used by the local controller 108 to determine how much power to request. For example, the local controller 108 can rely on an amount of product, a liquid level, the speed of a motor, an amount of torque or air flow, etc. Various sensors can be used to obtain the parameters, such as a flow meter, float sensor, scale, torque transducer, velocimeter, accelerometer, gyroscope, tachometer, etc. Based on a comparison between the measured parameters and corresponding set points or thresholds, the local controller 108 can request power. Furthermore, as described previously, the inter-system controller 106 can allocate the power between devices based on the requests and on a power allocation scheme.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system, comprising:
a plurality of cooking systems, comprising a first cooking system and a second cooking system, communicatively and electrically coupled with each other; and
a controller configured to:
receive an indication that the first cooking system is active;
receive an indication that the second cooking system is active;
receive indications of a first water temperature corresponding to a temperature of water in the first cooking system and a second water temperature corresponding to a temperature of water in the second cooking system;
determine a first time allotment within a predetermined time period for a first heating element of the first cooking system to receive all available electrical energy from an AC power source and a second time allotment within the predetermined time period for a second heating element of the second cooking system to receive all available electrical energy from the AC power source based at least in part on the indications of the first water temperature and the second water temperature, wherein the first time allotment is larger than the second time allotment to heat the water in the first cooking system at a greater rate than the water in the second cooking system until a threshold water temperature is satisfied; and
allocate the first time allotment to the first cooking system and the second time allotment to the second cooking system, wherein the first cooking system activates the first heating element during the first time allotment and deactivates the first heating element during the second time allotment and the second cooking system deactivates the second heating element during the first time allotment and activates the second heating element during the second time allotment, wherein transitions between the first time allotment and the second time allotment are based on a detection of the AC power source crossing a zero or common mode voltage.

2. The system of claim 1, wherein the indications of the first water temperature and the second water temperature comprise measured water temperatures.

3. A system, comprising:
a plurality of cooking systems, comprising a first cooking system and a second cooking system communicatively and electrically coupled with each other, wherein each cooking system of the plurality of cooking systems comprises a receptacle, a heating element, and a temperature sensor to determine a temperature of liquid within the receptacle; and
a controller configured to:
receive requests for power from the first cooking system and the second cooking system;
determine a first time allotment within a time period for the heating element of the first cooking system and a second time allotment within the time period for the heating element of the second cooking system to receive electrical energy based at least on the requests for power and the temperature of the liquid in respective receptacles of the first cooking system and the second cooking system; and
allocate the first time allotment to the first cooking system and the second time allotment to the second cooking system wherein the first time allotment is larger than the second time allotment to heat the liquid in the receptacle of the first cooking system at a greater rate than the liquid in the receptacle of the second cooking system until a cooking temperature threshold is satisfied, wherein transitions between the first time allotment and the second time allotment are based on a detection of the AC power source crossing a zero or common mode voltage.

4. The system of claim 3, wherein the controller is further configured to:
receive an indication that the first cooking system is active; and
receive an indication that the second cooking system is active.

5. The system of claim 3, wherein the first time allotment comprises a first continuous block of time, and the second time allotment comprises a second continuous block of time.

6. The system of claim 3, wherein the first time allotment is interleaved with the second time allotment.

7. The system of claim 3, wherein the first cooking system comprises at least one of a coffee maker, a skillet, a microwave oven, a toaster oven, and a hot plate and the second cooking system comprises a different one of at least one the coffee maker, the skillet, the microwave oven, the toaster oven, and the hot plate.

8. The system of claim 3, wherein the receptacle comprises a tank.

9. The system of claim 3, wherein the controller is further configured to determine the first time allotment and the second time allotment based at least on a location of the first cooking system and the second cooking system.

10. The system of claim 3, wherein the controller is further configured to determine the first time allotment and the second time allotment based at least on a frequency of use of the first cooking system and the second cooking system.

11. The system of claim 3, wherein the controller is further configured to determine the first time allotment and the second time allotment based at least on a priority level of the first cooking system and the second cooking system.

12. The system of claim 3, wherein the controller is further configured to determine the first time allotment and the second time allotment based at least on a time of day.

13. The system of claim 3, wherein the controller is further configured to determine the first time allotment and the second time allotment based at least on a workload of the first cooking system and the second cooking system.

14. A method of allocating power between a plurality of cooking systems, the method comprising:
receiving requests for power from a first cooking system and a second cooking system;
determining a first time allotment for each of a plurality of contiguous time periods for a heating element of the first cooking system and a second time allotment for each of the plurality of contiguous time periods for a heating element of the second cooking system to receive electrical energy based at least on the requests for power and a temperature of liquid in respective receptacles of the first cooking system and the second cooking system, wherein the first time allotment is larger than the second time allotment in each of the plurality of contiguous time periods to heat the liquid in the receptacle of the first cooking system at a greater rate than the liquid in the receptacle of the second cooking system until a cooking temperature threshold is satisfied; and
allocating the first time allotment to the first cooking system and the second time allotment to the second cooking system, wherein transitions between the first time allotment and the second time allotment are based on a detection of the AC power source crossing a zero or common mode voltage.

15. The method of claim 14, wherein the first time allotment comprises a first continuous block of time, and the second time allotment comprises a second continuous block of time.

16. The method of claim 14, wherein the first time allotment is interleaved with the second time allotment.

17. The method of claim 14, wherein requests for power are based at least on a difference between a cooking temperature threshold and each of a temperature of water in the first cooking system and a temperature of water in the second cooking system.

18. The method of claim 14, further comprising determining the first time allotment and the second time allotment based at least on a time of day.

19. A cooking system communicatively coupled with another cooking system, the cooking system comprising:
a receptacle configured to hold a liquid;
a heating element thermally coupled to the liquid;
a temperature sensor thermally coupled to the liquid and configured to measure the temperature of the liquid in the receptacle; and
a first controller configured to:
request power from a second controller based at least on the measured temperature,
receive power allocation instructions that identify a first time allotment within a time period in which the heating element receives electrical energy from an AC power source, wherein the first time allotment is larger than a second time allotment for another cooking system to heat the liquid in the receptacle of the cooking system at a greater rate until a cooking temperature threshold is satisfied, and
alternately allocate and de-allocate power to the heating element during the time period based at least on the power allocation instructions, wherein transitions between allocation and de-allocation of power are based on a detection of the AC power source crossing a zero or common mode voltage.

* * * * *